Figure 7:
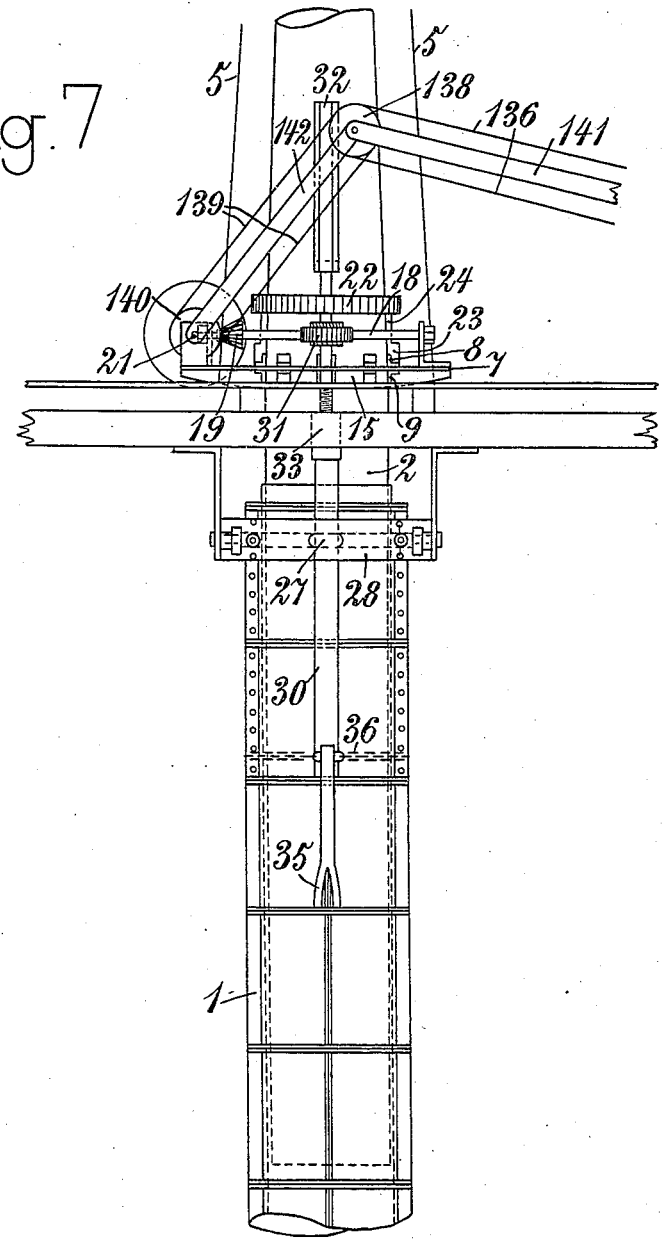

No. 859,031. PATENTED JULY 2, 1907.
N. A. H. ABEL.
CRANE FOR HOISTING AND DISTRIBUTING BUILDING MATERIALS, &c.
APPLICATION FILED NOV. 27, 1905.
10 SHEETS—SHEET 1.
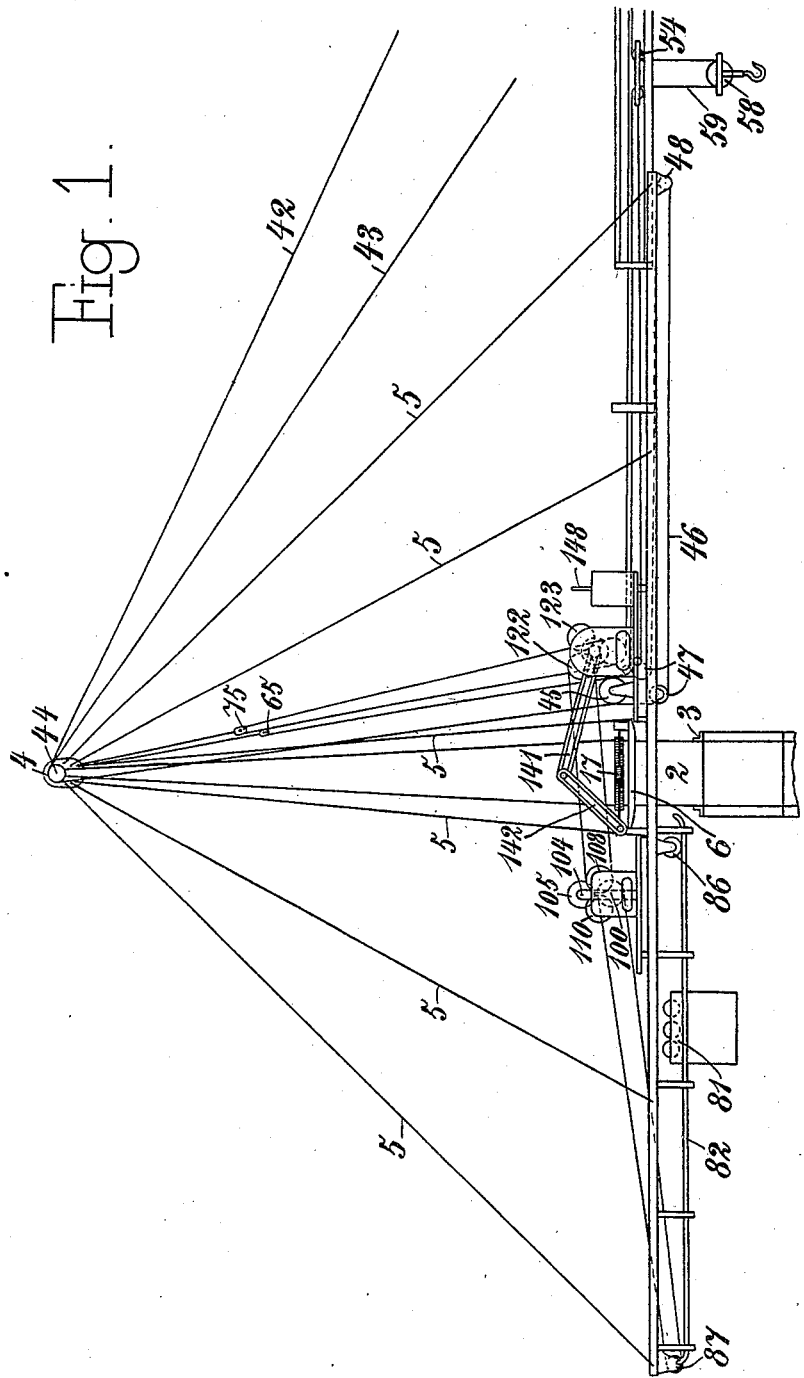
WITNESSES:
INVENTOR,
NIELS ANDERS HANSEN ABEL,
BY
Attorney.

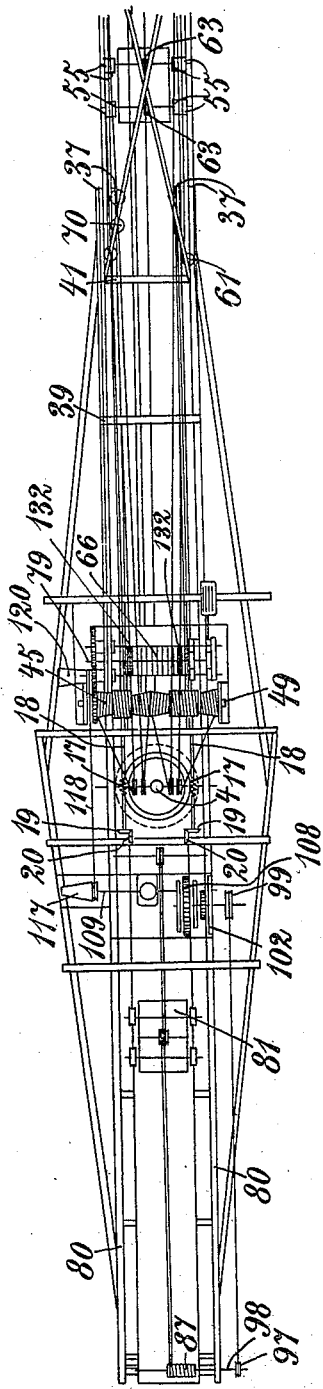

No. 859,031. PATENTED JULY 2, 1907.
N. A. H. ABEL.
CRANE FOR HOISTING AND DISTRIBUTING BUILDING MATERIALS, &c.
APPLICATION FILED NOV. 27, 1905.
10 SHEETS—SHEET 3.
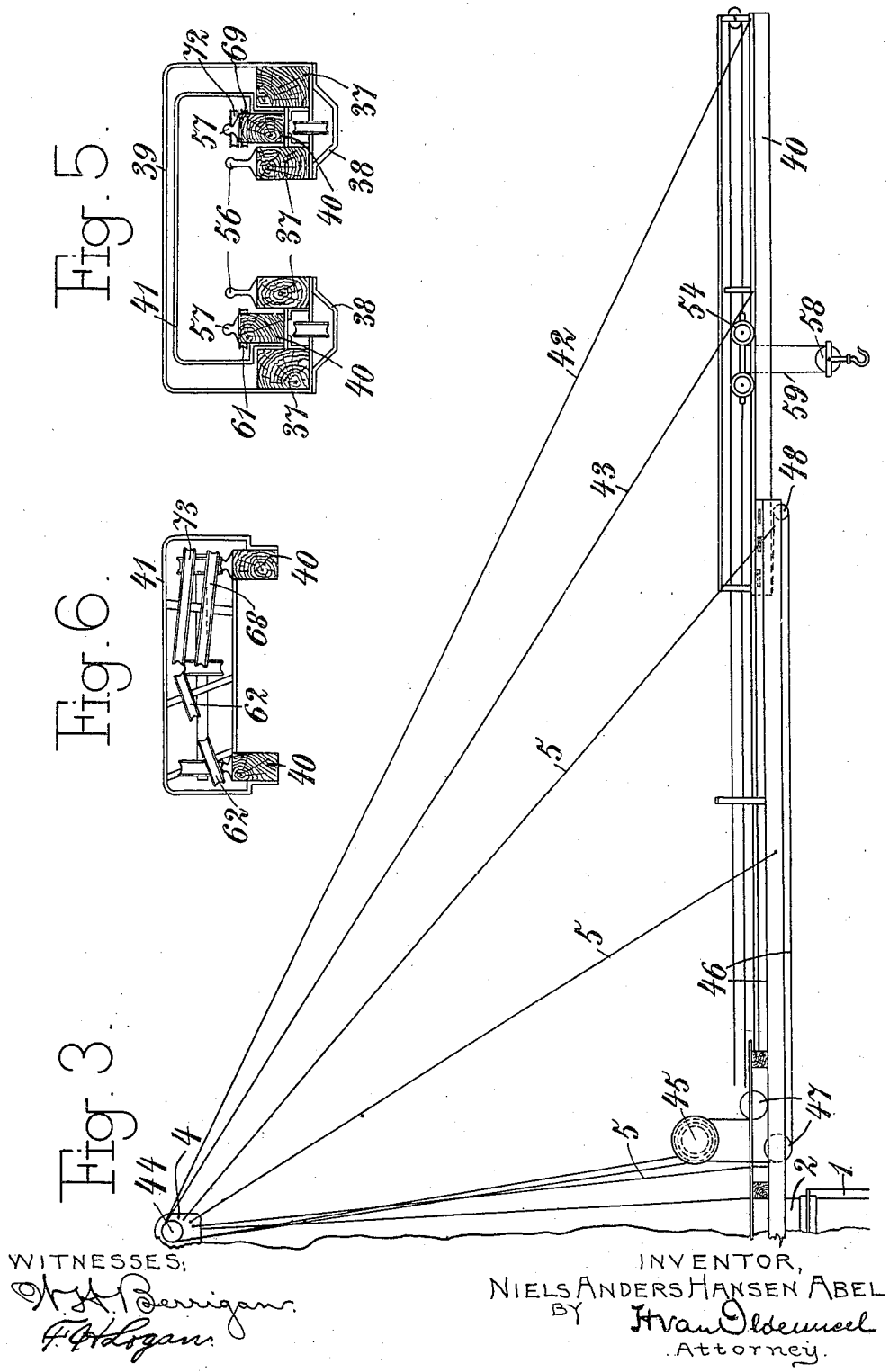
WITNESSES:
INVENTOR,
NIELS ANDERS HANSEN ABEL,
BY
Attorney.

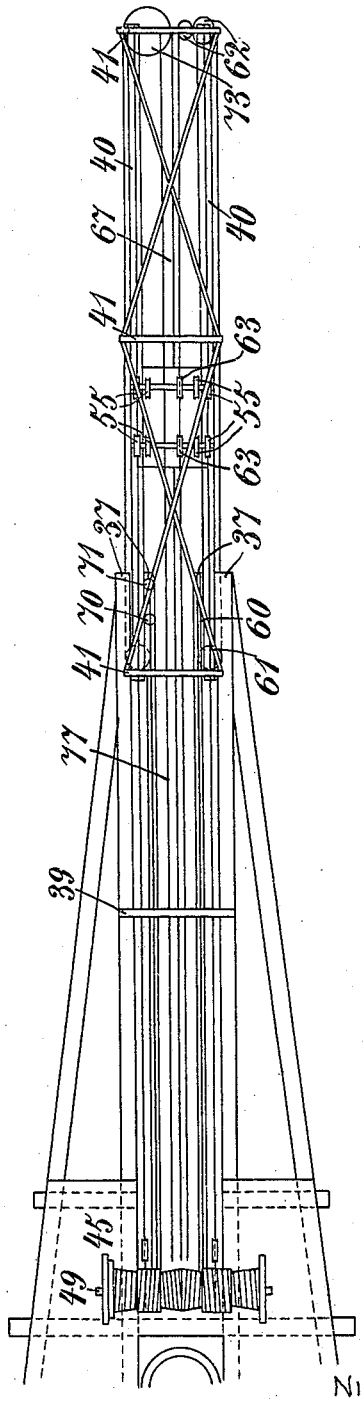

No. 859,031. PATENTED JULY 2, 1907.
N. A. H. ABEL.
CRANE FOR HOISTING AND DISTRIBUTING BUILDING MATERIALS, &c.
APPLICATION FILED NOV. 27, 1905.

10 SHEETS—SHEET 5.

WITNESSES:

INVENTOR,
NIELS ANDERS HANSEN ABEL,
BY
Attorney.

No. 859,031. PATENTED JULY 2, 1907.
N. A. H. ABEL.
CRANE FOR HOISTING AND DISTRIBUTING BUILDING MATERIALS, &c.
APPLICATION FILED NOV. 27, 1905.

10 SHEETS—SHEET 6.

WITNESSES:

INVENTOR,
NIELS ANDERS HANSEN ABEL,
BY
Attorney.

No. 859,031. PATENTED JULY 2, 1907.
N. A. H. ABEL.
CRANE FOR HOISTING AND DISTRIBUTING BUILDING MATERIALS, &c.
APPLICATION FILED NOV. 27, 1905.
10 SHEETS—SHEET 7.

WITNESSES:

INVENTOR,
NIELS ANDERS HANSEN ABEL,
BY
Attorney.

No. 859,031. PATENTED JULY 2, 1907.
N. A. H. ABEL.
CRANE FOR HOISTING AND DISTRIBUTING BUILDING MATERIALS, &c.
APPLICATION FILED NOV. 27, 1905.

10 SHEETS—SHEET 8.

WITNESSES:

INVENTOR,
NIELS ANDERS HANSEN ABEL,
By
Attorney.

No. 859,031. PATENTED JULY 2, 1907.
N. A. H. ABEL.
CRANE FOR HOISTING AND DISTRIBUTING BUILDING MATERIALS, &c.
APPLICATION FILED NOV. 27, 1905.

10 SHEETS—SHEET 9.

WITNESSES;

INVENTOR,
NIELS ANDERS HANSEN ABEL,
BY
Attorney.

No. 859,031. PATENTED JULY 2, 1907.
N. A. H. ABEL.
CRANE FOR HOISTING AND DISTRIBUTING BUILDING MATERIALS, &c.
APPLICATION FILED NOV. 27, 1905.
10 SHEETS—SHEET 10.

WITNESSES;

INVENTOR,
NIELS ANDERS HANSEN ABEL,
BY
Attorney.

UNITED STATES PATENT OFFICE.

NIELS ANDERS HANSEN ABEL, OF COPENHAGEN, DENMARK.

CRANE FOR HOISTING AND DISTRIBUTING BUILDING MATERIALS, &c.

No. 859,031.   Specification of Letters Patent.   Patented July 2, 1907.

Application filed November 27, 1905. Serial No. 289,244.

*To all whom it may concern:*

Be it known that I, NIELS ANDERS HANSEN ABEL, master carpenter, Gl. Kongevy 100, Copenhagen, in the Kingdom of Denmark, have invented certain new and useful Improvements in Cranes for the Hoisting and Distribution of Building and other Materials; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The invention relates to a crane designed specially for hoisting and distributing building and other material during the work on building grounds.

By the construction of the crane, the height of the jib above the ground during the course of the work can always be made to suit the varying scaffolding heights, and the material can easily be lifted from and removed to any place within the building ground, and even where there are adjoining buildings which limit the space of turning for the jib.

To these ends, the main body of the crane is composed of two parts, the lower one of which is capable of being lengthened and shortened during the progress of the work, and a jib-extension is provided which can be projected any necessary length from the main part of the jib, when the latter is turned in the direction of the place to be reached, or at the same time as this turning. Further an automatic balancing of the jib-extension, when in motion along the swing-bridge and of the weight during the hoisting and transport of same along the bridge is assured by means of a special arrangement of a counterweight sliding below the swing-bridge.

Other advantages, which will appear from the description, are gained by the arrangement of suitable connections between the different parts of the crane.

An embodiment of my invention is shown in the accompanying drawings, wherein

Figure 8:
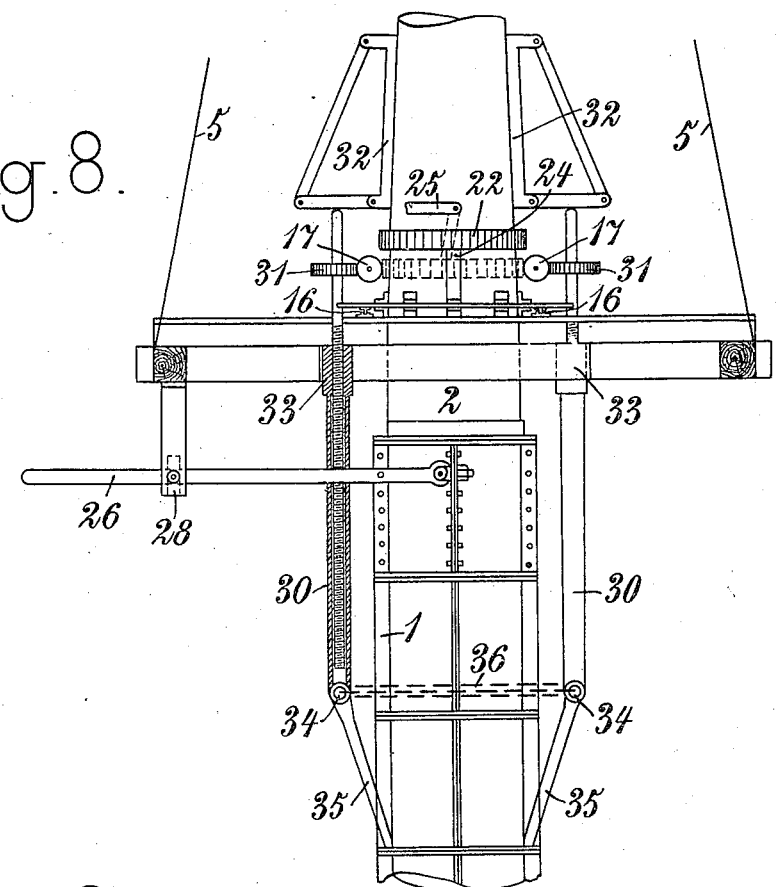
Figure 9:
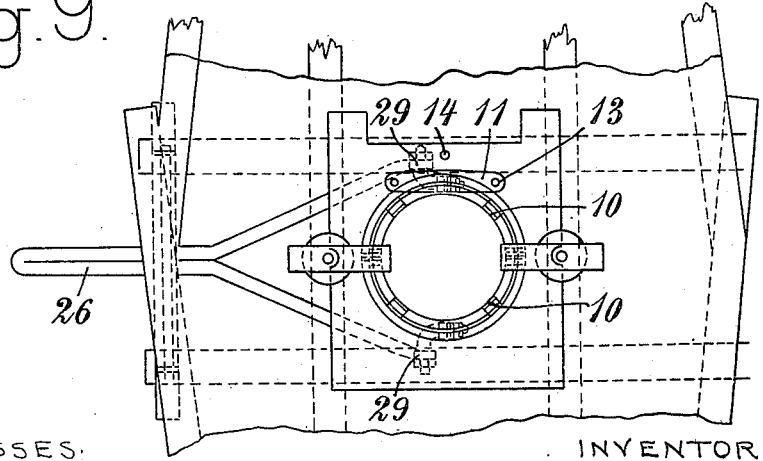
Figure 10:
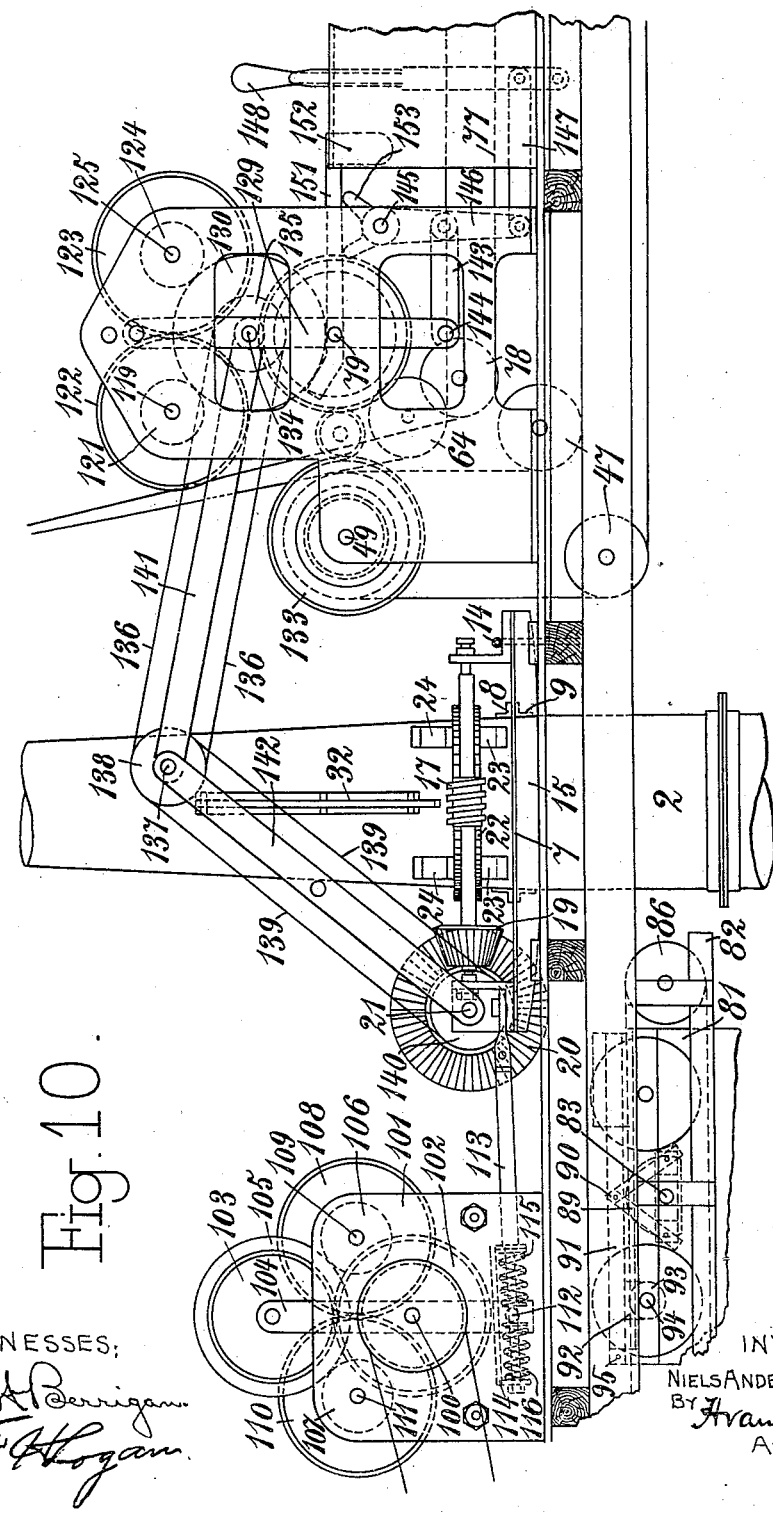
Figure 11:
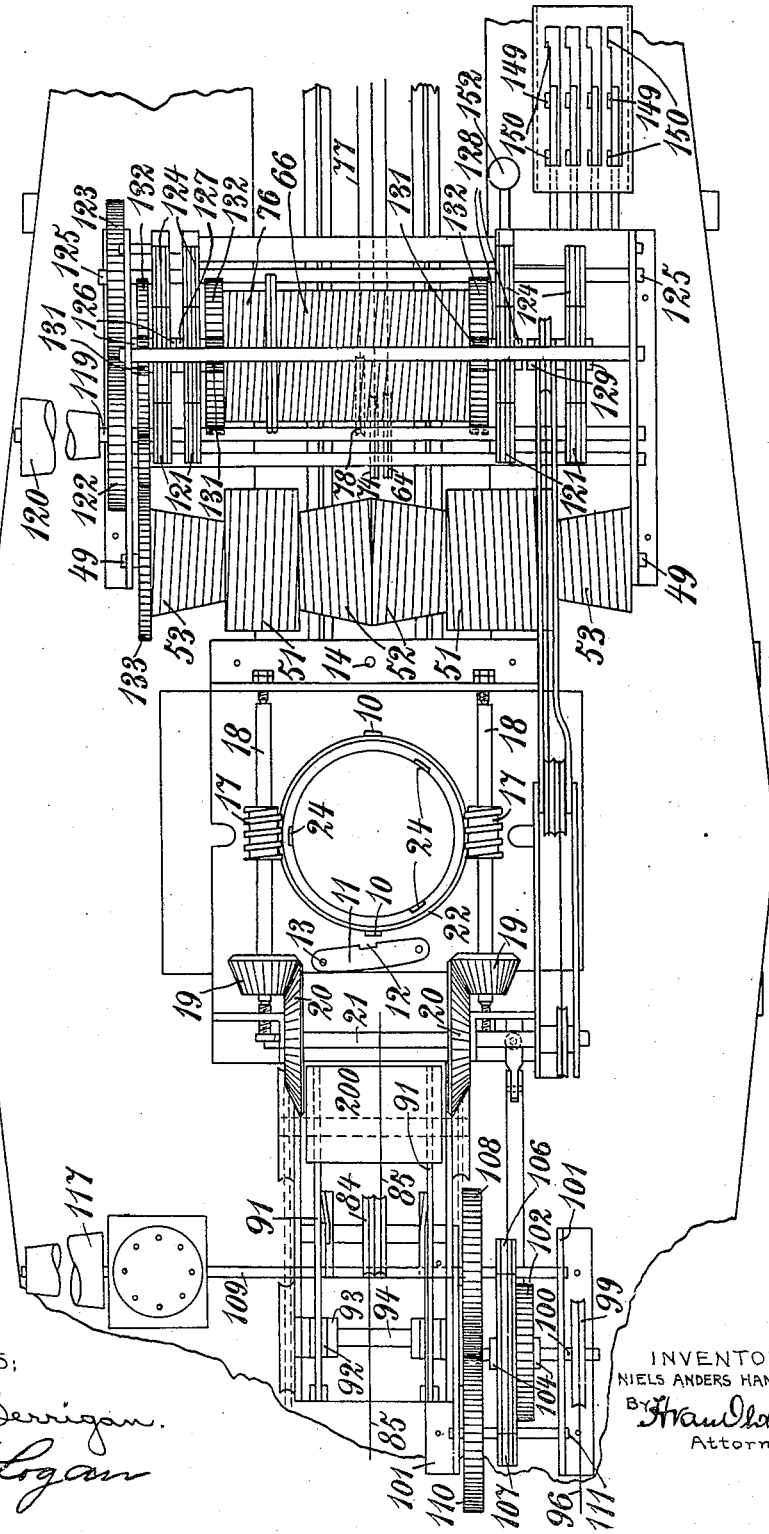
Figure 12:
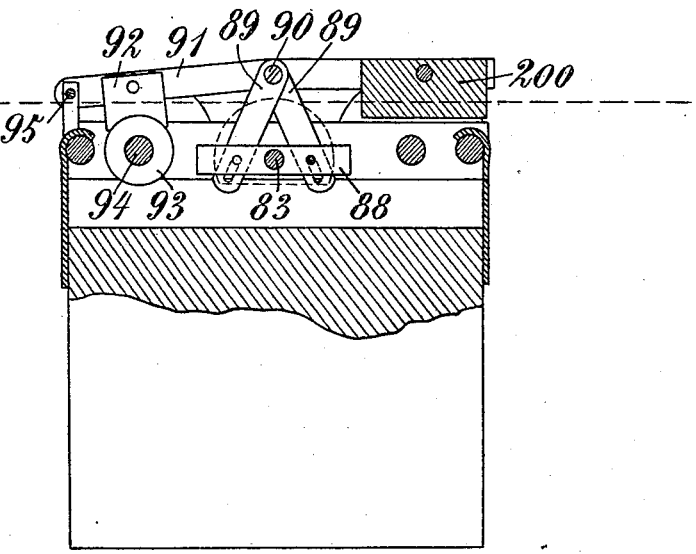
Figure 13:
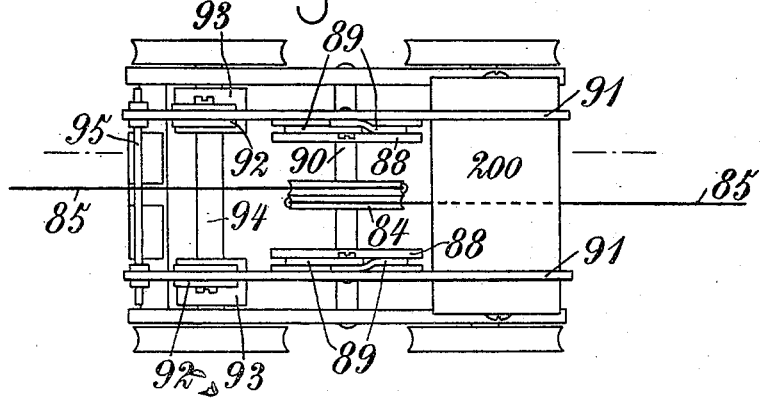
Figure 14:
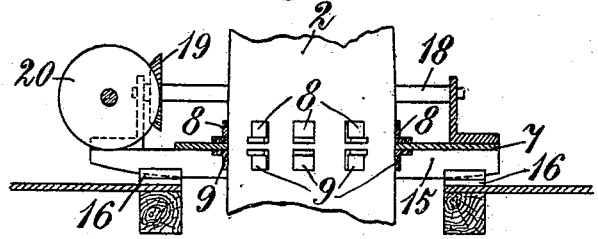
Figure 15:
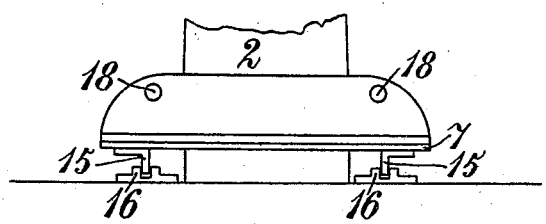
Figure 16:
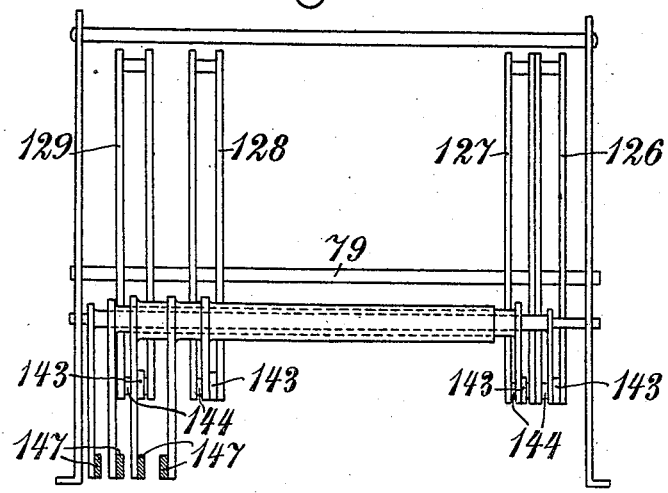

Figure 1 is a side view of the jib and part of the main body of the crane, and Fig. 2 is a plan view thereof; Fig. 3 is a side view of the front part of the jib, showing also the jib-extension attached thereto; Fig. 4 is a plan view of Fig. 3; Fig. 5 is an enlarged cross-sectional view of the front part of the jib and the jib-extension; Fig. 6 is an enlarged end view of the jib-extension; Fig. 7 is an enlarged side view showing the means for moving the crane-mast upwardly, when the crane-column is to be lengthened or shortened; Figs. 8, 9, are, respectively, end and plan views of the devices of Fig. 7; Fig. 10 is a side view, on an enlarged scale, of the middle part of the jib, Fig. 11 is a plan view of the same parts. Figs. 12 and 13 are, respectively, side and plan views of the counterweight apparatus; Figs. 14 and 15 are, respectively, a cross-sectional view and an end view of the guide-piece; and Fig. 16 is an end view of the frames 126, 127, 128 and 129.

Certain parts have been omitted from some of the figures, for the sake of clearness.

The main body of the crane consists of two parts, a lower part or column 1 which, by means of a foot provided with stays (not shown on the drawing) rests on a suitable support and is in the form of a cylindrical pillar, and the upper part or mast 2 that is inserted in the upper end of said pillar, in a socket formed thereby in a manner allowing it to be raised and lowered and to rotate therein. As shown in Fig. 7, the column 1, or the upper end thereof, may be composed of quadrants or bent metallic plates with outward flanges connected, to each other by means of bolts both at the vertical and the horizontal junctures. By affixing to or removing tubular sections from the upper end of the column 1, which is done when the mast 2 has previously been raised, this column 1 can be lengthened or shortened as required. The mast 2 may be constructed in the same way as the lower part or column 1, and is provided at some distance from its lower end with a circular flange 3, by means of which it rests on uppermost section of the column 1.

At the top of the mast a top-bar 4 is revolubly inserted, and to which a jib (hereinafter described) is suspended by means of a suitable number of stays 5. Said jib has an opening at its middle permitting it to swing round the main body of the crane. The opening in the jib is partly covered by a guide piece fastened to the mast 2 of the crane in such a way that it can revolve by being shoved in with its cover-plate 7 (Figs. 7, 10 and 14) between angle-iron rings 8 and 9, fixed on the mast. When the guide piece is to be held stationary to the mast, at a time the column 1 is to be lengthened or shortened, a stopping-hook or latch 11 (see Figs. 9 and 11) pivoted on the guide-piece, is brought to have a notch 12 thereof engage with one of the projections 10 (Fig. 11), and the hook is then kept in the desired position by inserting a stop in the free end of the hook at 13.

When the column 1 is to be lengthened or shortened the jib is temporarily secured to the guide-piece by fixing a loose main-bolt through a hole 14 in the guide-plate 7 (see Figs. 9 and 11) down into the jib. On the contrary, when said bolt is taken out, the jib may move with relation to the guide piece, this guide piece being provided with two guides 15 (Figs. 7, 10, 14 and 15) curved in a circle with their center in the top of the mast 2, and the jib is provided, on each side of the main body, with two pairs of angle brackets 16 (Figs. 8, 14 and 15), which engage the sides of the guides in such a way that the jib is thereby guided in a longitudinal direction, and must partake of the revolving movements of the guide piece. When the guide-piece is forced to turn around the mast 2, the jib will follow and consequently be also turned. Moreover, the jib can be moved in its longitudinal direction, guided by the guides 15.

For revolving the jib round the mast 2 are used two worm-gears 17 (Figs. 8, 10 and 11) supported by the guide piece and disposed in the longitudinal direction of the jib, one at each side of the main body, and serving also (as hereinafter described) as parts of the apparatus for lifting the mast 2 when the column 1 is to be lengthened or shortened. These worm-gears 17 are fixed each on a horizontal shaft 18 (Fig. 11) which also carries a conical pinion 19. The pinions 19 are in gear with larger conical pinions 20 fixed on a cross-shaft, which also carries parts by means of which the movement of the motor is transferred, through belt gearing, to the worm-gears 17 in a way hereinafter described. During the turning of the swing-bridge the worm-gears 17 normally remain in mesh with a worm-ring 22, fastened to the mast at the height shown in Fig. 10, and by dotted lines in Fig. 8. The under side of the ring 22 is retained in the desired position by bearing against hooks 23 (Fig. 10) on the heel of check-rails 24 fastened to the mast 2 and by links 25 (Fig. 8) that are turned down against it. The ring is prevented from turning sidewise by being provided with notches catching round the named check-rails 24 (Fig. 10). When the links 25 are turned or raised the ring 22 can be shoved up into the position shown in Figs. 7 and 8, engaging notches of the check-rails. When the worm-ring 22 is thus brought out of connection with the worm-gears 17 (see Fig. 8) these can be used for the lengthening or shortening of the crane-column 1, instead of for turning the jib. However, as explained, the guide piece 6 and therewith the jib must first be prevented from revolving round the mast 2, and the bridge from moving along the guide piece. Further on it is necessary to prevent the mast 2 together with the top-bar 4, the guide piece 6 and the jib from revolving in the column 1 during the work. This can be effected suitably by means of a supported in the fork-shaped rod 26 (Figs. 8 and 9), whose outer end slides in a hole 27 (Fig. 7) in a rail or the like 28; the rod 26 revolves around a horizontal axis, so that its turning pivots have their beds in brackets issuing from the jib downwards. The end of the prongs, consisting each of a joint-piece 29 (Fig. 9), are conducted through two of the bolt-holes in the vertical flange-parts of the column 1 on opposite sides of this column, and the connection is tightened by means of a nut on the screw-cut extremity of each joint-piece.

For raising the mast 2, when the column 1 is to be lengthened or shortened, loose lifting-screws, 30, are disposed one at each side of the crane, and the screw-wheels 31, carried by these screws, are brought into engagement with the screws 17. Above each of the lifting-screws, an angle bracket 32, is fixed collapsibly on the mast 2, and these are arranged in such a way that the tops of the lifting-screws bear against such brackets. The brackets 32 are in fixed connection with the mast 2, so that the screws 30, which strike against the brackets 32, will lift the mast. The brackets 32 are collapsible, so that, after use, they can be collapsed against the mast. The nuts or sleeves 33 wherein the lifting screws move, are provided with downwardly-extending legs jointed to the parts 33, and provided with forked ends 34, adapted to rest upon the flanges of the column 1. The lower ends of the nuts 33 are kept in a proper position relatively to each other and to the column 1, by means of a chain 36.

When the mast 2 together with the jib and appurtenances have been lifted sufficiently by rotating the screws 17 and thereby the lifting-screws 30, a tubular section, of curved and attached plates, can be fitted to or can be removed from the upper end of the column 1. The screws 30 are then screwed down, until the mast 2 shall rest again upon the plates which then form the top of the lengthened or shortened column 1, and the clutches 35 are then disposed on the flanges next in height, and the lifting, and attaching or removal of tubular sections, again proceeds as described.

It is evident that the lifting-screws can also be arranged so that the nuts or sleeves bear against the mast 2, and the screws against the column 1, while in that case the screw-wheels 31 are fixed on the nuts.

The main part of the jib projects, as before stated, on both sides of the main body of the crane. The jib part on one side of the main body I call the front part of the jib. It is built somewhat longer than the jib-part on the other side of the main body (which I call the rear part of the bridge), and is provided with a slidably-connected jib-extension. The front part of the jib is composed of pairs of parallel beams 37 (Figs. 4 and 5) kept together by upper and lower bent bars 38 and 39. Between these double-beams are slidably situated two beams 40 forming part of a jib-extension and kept together by three arched bent bars 41 (Figs. 4 and 6) and by diagonal-stays. The stationary beams 37 are suspended from the top-bar 4, Fig. 3, by means of stays 5, hereinbefore mentioned, while the two sliding beams 40, are suspended by means of chains 42 and 43 running over chain-wheels on the top-bar 4, are connected with one or more chain-rollers 45. These chain-rollers are also so connected, by means of chains 46 and chain-wheels 47 and 48, with the sliding beams 40 in such a way that, when the jib-extension is moved outward by rotating the roller 45 in one direction by means of a cog-wheel 133 (hereinafter described) fixed on the roller-shaft 49, and gearing with a cog-wheel attached to the windlass, the supporting chains 42 and 43 of the jib-extension and also the pulling chains 46 will be correspondingly wound and unwound from the rollers; this will be the case also upon winding the chains on the rollers when the jib-extension is being moved inwardly.

In order to obtain an exact simultaneous winding and unwinding, or the reverse, of the chains, the rollers can be arranged, as an entirety in the particular form shown in Fig. 11. The roller-parts 51 are cylindrical, whereas the exterior surfaces of the other parts (such as 52 and 53) while shown on the drawing as straight lines are most useful, in practice, when provided with curved surfaces, and such slight curvature is the one best suited for the purpose, according to calculation, the middle part 52 of the roller assuming a form somewhat like that of a barrel or double truncated cones, and the outer parts 53 a form like that of the end of a barrel or a truncated cone. As indicated in Fig. 11 of the drawings by the inclined lines, spiral grooves are cut or otherwise provided in one and all of the roller parts, thus compelling the chains to roll evenly and regularly round the rollers.

I employ a hoisting mechanism consisting of a truck 54 with four pairs of wheels or rolls 55 (Fig. 2) running on rail-pairs 56, Fig. 5, on the front part of the jib or on rail-pairs 57 on the jib-extension, or on both rail-pairs at the same time. The hoisting is effected by means of a block 58 and a rope, chain or the like 59, (Figs. 3 and 4) one end 60, of which (Fig. 4) is anchored to one of the stationary beams 37, and thence conducted over pulleys 61 and 62 on the jib-extension and the pulleys 63 on the truck, between which the block 58 is inserted in a bight of the hoisting rope, and then under a guide pulley 64 and over a block 65 (Fig. 1), suspended from the top-bar 4, down to a roller 66 on the windlass. By means of this arrangement the weight to be hoisted will remain at the same height even if the jib-extension be moved backwards and forwards.

The moving of the truck 54 on the rails is effected in such a way that the shifting of the jib-extension has no influence thereon. To the front part of the truck is fastened a chain, rope or the like, 67, (Figs. 1 and 4) which is conducted over a lower pulley 68 (see Fig. 6) in the outer end of the jib-extension, over a lower pulley 69 (Fig. 5), over the pulleys 70 and 71 (Fig. 4) the upper pulley 72 (Fig. 5), and the upper pulley 73 (Fig. 6), under a guide-pulley 74 (Fig. 11), and over a two-sheaved block 75 (Fig. 1) suspended from the top-bar 4, down to a roller 76 (Fig. 11) on the windlass. A second chain, rope or the like, 77, is fastened to the inner end of the truck 54, and conducted under a guide pulley 78 and over the other sheave in the block 75 to said roller 76, of the windlass. To this roller one end of each of the chains 67 and 77 is fastened in such manner that when one of the chains is wound off the roller, the other one will be wound onto same. The rollers 66 and 76 are rotatively fixed both on the main shaft, 79, of the windlass, and are provided with guide-grooves like the chain rollers 45.

The balancing of the jib-extension during its motion, and of the weight during the hoisting and moving of same along the jib, is effected by a truck automatically movable along the rear part of the jib, which rear part may be composed of only two beams 80, Figs. 1 and 2, the truck being provided with a braking apparatus and carrying a box containing the ballast. The truck 81, Figs. 1, 10, and 11, runs on rails 82 fastened by supporting bars below the rear part named. Across the truck 81 is fastened a shaft 83 to which is fixed a segment of a double cord-sheave 84. To this sheave are anchored both ends of a chain or rope 85 which moves the truck 81; said chain 85 is conducted over a sheave 86 through the truck-box to a roller 87 (Figs. 1 and 2), and from there back to the sheave 84 aforesaid. On the shaft 83 are fixed two arms 88 (Figs. 10, 12 and 13) one on each side of the sheave 84 and provided with notches in which connecting bars 89 catch. These bars 89 are each connected with a brake-lever 91 (Figs. 10, 11, 12 and 13) by means of bolts (90) so as to enable the bars to swing together. Each brake lever is fastened to a brake-block 92, and the latter bear against brake-sheaves 93 on one of the truck-axles 94. Each of the brake-levers 91 is at one end, connected with the truck box by means of pivots 95, while, at the other end, the levers are loaded with a weight 200 pressing the brake blocks 92 against the brake sheaves 93. The connecting bars 89 are, at their lower ends, provided with slots through which is passed a cross-bolt in the arms 88, so that the bars 89 allow a partial rotation of the line-sheave segment 84. By means of the arrangement described, the connecting bars 89 will raise the brake-blocks 92 from the brake-sheaves 93, when the shaft 83 and the arms 88 are turned, by a pull of the chain or line 85, and the blocks again bear against the sheaves as soon as the pull ceases.

The moving of the counterweight-truck 81 is produced and kept up automatically by means of a belt, line or the like 96 (Fig. 11), conducted over a belt-sheave 97 on the outside of a shaft 98, on which the chain-roller 87 (Fig. 2) is disposed, and over a second belt-sheave 99. The latter belt-sheave is fixed (see Fig. 11) on a shaft 100 which is journaled in a frame 101, and said shaft within the frame, also carries a cog-wheel 102 (Fig. 10) which engages another cog-wheel 103 journaled in the arms of a frame 104 which is, in turn, mounted to oscillate on the axle 100. The axle of wheel 103 also carries a friction-sheave 105 stationarily connected with said wheel 103. When the balance of the jib is disturbed, whether by reason of the hoisting of the weight or the movement of same along the jib, or the sliding of the jib-extension, the frame 104 will oscillate or swing to one side or the other upon the axle 100, and the friction-sheave 105 will thereby bear against one or the other of two smaller friction-sheaves 106 and 107 (Fig. 10). The sheave 106 is together with a cog-wheel 108, fixed with the frame 101, on a transmission shaft 109, connected to the driving shaft of the motor (for instance, by means of a screw or screw-wheel), and through which transmission shaft the movement of the motor is transferred to the windlass. The cog-wheel 108 is in gear with another cog-wheel 110 mounted with the aforesaid friction-sheave 107, of a shaft 111 fixed revolvingly in the frame 101, and making this shaft rotate as long as the motor is in motion. As long as the larger friction sheave 105 is in touch with one of the smaller friction-sheaves (106 or 107) it will rotate to one side or the other and cause the belt sheaves 97 and 99 also to turn, and as the roller 87 also turns thereby, the counterweight will be moved to one side or the other along the jib.

In order that the friction sheave 105 shall press firmly against the smaller sheaves (106 or 107), necessary for moving the counterweight, the bars of frame 104 are provided with a cross piece 112 having an opening for the passage of the reduced end of a bar 113, one end of which is pivotally connected with the guide pieces 6 (hereinbefore described) and whose other end is bolted to an angle bar 114 (Fig. 10) round about the cross-piece 112. The ends of two helical springs 115 and 116, fitted round the reduced end of bar 113, bear against the cross-piece 112 and, respectively, against the bar 113 and the angle bar 114. As soon as the balance of the jib is disturbed, it will move lengthwise with respect to the guide-piece 6, and one of the springs named will thereby be compressed, causing a pull at the lower part of the frame 104 which serves to swing the frame, thus providing for the necessary friction pressure. When this pull ceases by the jib again resuming its position of balance, the pull in the chain 85 will also cease, and the counterweight 81 will stop.

Transmission shaft 109, carries at one outer end a conical belt sheave or rope-sheave 117 (Fig. 11) over which the belt 118 (Fig. 2) moves in order to give a shaft 119, (rotatable in the frame of the windlass and carrying another conical belt-sheave, 120, in reversed position) greater or smaller velocity. Secured on the shaft 119 are four small friction sheaves 121 and a larger cog-wheel, 122, which engages another cog-wheel, 123, fixed together with four friction sheaves 124 like friction sheaves 121, each disposed opposite a friction sheave 121, and all secured on a shaft 125 also rotatable in the frame of the windlass.

Below and midway between the shafts 119 and 125, (Fig. 10) the main shaft 79 (hereinbefore mentioned) of the windlass, is fastened stationarily in the frame, upon which shaft four frames, 126, 127, 128 and 129, (Figs. 10, 11 and 16) rockingly mounted, two on each end of the shaft. Between the frames 127 and 128 the two above mentioned rollers 66 and 76 are, as aforesaid, revolubly fixed on the shaft 79 (Fig. 11).

In each of the frames 126—129 a friction sheave 130 (Fig. 10) is inserted which, when the frame concerned is caused to oscillate, in either direction, on the main shaft 79, presses against one or the other of the smaller friction sheaves 121 or 124, which are fixed in the same vertical plane, whereby one of the moving mechanisms of the crane is brought into action in such a way that movement either in one or the other direction is produced. The oscillations of the frame 126 control the movement of the jib-extension, while the oscillations of the frames 127, 128 and 129, control the operations of the mechanisms for effecting (1) the transport of the weight along the jib, (2) the hoisting, or (3) the turning of the screws 17 which (as before explained) control either the turning of the jib round the main body or the raising of the upper part 2 of the main body from out the lower part 1.

The rotating movement conveyed to one of the friction sheaves 130, by a smaller friction sheave, is transferred, so far as the three first-named moving mechanisms are concerned, to one of the rollers 45, 66 or 75, by means of a pinion 131 on the shaft of the friction sheave 130. The pinions 131 are fixed over and catch in corresponding cog-wheels 132 running loosely on the main shaft 79. While the movements of the rollers 66 and 76 can thereby be produced directly, the extreme cog-wheel 132 is in gear with the cog-wheel 133 fastened on the shaft 49, together with which cog-wheel the roller 45 (Figs. 1 and 3) will be moved.

In the frame 129 no pinion is placed on the shaft 134 carrying the big friction sheave 130 but instead I mount thereon, a chain pulley 135 (Fig. 10) over which a chain 136 is conducted. This chain also goes over one of a pair of pulleys 138 fastened to an axle 137, while another chain 139 connects the other of the pulleys 138 with a chain pulley 140 fixed on the shaft 21, as hereinbefore described. The mutual connection between the shafts 21, 137 and 134 is effected by a joint structure consisting of two forked links 141 and 142. This joint connection causes the rotating movement of the frame 129 to be transferred quite regularly and smoothly to the chain pulley 140 and from the latter to the screws 17, independently of the position of the jib, at any given moment, with regard to the guide piece 6. Rotation of the jib round the mast 2 can thus take place, even if the balance of the jib be disturbed by movements of the load or of the jib-extension, or of both at the same time.

The rocking or oscillations of any of the frames 126—129 round the main shaft 79 is effected by means of a link or member 143, engaging, at one end, with a bolt 144 at the bottom of the frame and at its other end engaging an arm connected with one of four tubes or sleeves that are co-axially disposed on a cross shaft 145. The connection might also be established with only two or three coaxial tubes, or the tubes may be replaced by other means of connection. At its opposite end each of the tubes named carries a downward projecting arm 146 (Fig. 10) which pivotally engages a corresponding link 147, forming part of the operating mechanism which also includes four operating levers 148. Each of these levers can take either a middle-position or one of two extreme positions, and is kept in place by engaging notches at 149 or 150, as suits the purpose. In its middle position, a lever 148 will put the corresponding operating mechanism out of action, while in either of the extreme positions such lever will cause this mechanism to move in one direction or in the opposite direction.

The short arm of a two-armed lever 151, fixed revolvingly on the main shaft 79 in the frame 128 is kept pressed up against the friction sheave 130, mounted in the same frame, by means of a weight 152 on the long arm of the lever or by other suitable means. This pressure which causes braking for the hoisting movement, is neutralized when the lever 148 is placed in one of its extreme positions and the corresponding tube surrounding the shaft 145 is consequently revolved. One of the two arms fixed on this tube will then lift the brake lever out of contact with the sheave 130. For the purpose of lowering burdens more quickly by their weight alone, a handle for the direct lifting off of the brake lever may also be arranged.

Instead of friction sheaves the mutual positions of which will determine the movements both of the counterweights and of the different moving mechanisms, other means might also be employed which are able to produce the same effects, as, for instance, cams and corresponding rollers, shafts or the like.

What I claim and desire to secure is:

1. In a crane for hoisting, a lower member provided with a socket, a mast having its end within the socket of the lower member, mechanism carried by the lower member for raising the mast relatively to the lower member, and removable stopping means secured to the upper end of the lower beam-member and surrounding and constituting a rest for the mast.

2. In a crane for hoisting, a lower member provided with a socket, a mast having its end within the socket of the lower member, and an engine and connections supported by the lower member for raising the mast relatively to the lower member.

3. In a crane for hoisting, a lower member provided with a socket, a mast having its end within the socket of the lower member, a swinging distributing jib suspended from the upper member, and connections operable from said jib for raising the mast relatively to the lower member.

4. In a crane for hoisting, a lower member provided with a socket, a mast having its end within the socket of the lower member a swinging distributing jib suspended from the mast, and an engine carried by the jib and connected with means supported by the lower member for raising the mast relatively to the lower member.

5. In a crane for hoisting, a lower member provided with a socket and a mast rotatably seated in said socket, and relatively movable thereon for raising and lowering, connections carried by the mast for effecting its rotation, connections carried by the lower member for effecting raising and lowering of the mast, and mechanism for engaging with either of the connections as desired.

6. In a crane for hoisting, a lower member provided with a socket and a mast rotatably seated in said socket and relatively movable thereon for raising and lowering, a toothed ring surrounding and slidable upon the upper beam member, screw members and gears connected therewith for raising and lowering said mast, gears connected with the driving engine, and means for effecting connection of the last-named gears with either of the specified connections.

7. In a crane for hoisting, a lower member provided with a socket and a mast rotatably seated on said socket and relatively movable thereon for raising and lowering, a swinging distributing jib suspended by the rotatable mast and means for locking the jib to and disconnecting it from said mast.

8. In a crane for hoisting, a lower member provided with a socket and a mast rotatably seated in said socket and relatively movable thereon for raising and lowering, a swinging distributing jib suspended from the upper member, a jib-extension slidably carried by the jib, an engine carried by the crane, and connections from said engine for independently effecting raising and lowering of the mast, swinging the jib as desired, and traversing the jib-extension.

9. In a crane for hoisting, a lower member provided with a socket and a mast rotatably seated in said socket and relatively movable thereon, for raising and lowering, means for effecting such raising and lowering, a swinging distributing jib suspended from the mast, means for effecting swinging of said jib, and means for disconnecting said jib-swinging means and engaging it with the means for raising and lowering the mast.

10. In a crane for hoisting, a body part, a swinging distributing jib suspended from said body part, means for swinging said jib, an engine carried by the jib and links 141, 142, carrying belts for transmitting motion from the engine to the jib-swinging means.

11. In a crane for hoisting, a body part, a swinging distributing jib suspended from body part, counterweight means slidably connected with said jib, and an apparatus comprising balancing parts for running in either direction and a traction rope controlling the sliding of the counterweight means.

12. In a crane for hoisting, a lower member provided with a socket, a mast having its end within the socket of the lower member and means for raising and lowering the mast, said means comprising lifting screws 30, gear wheels 31 on said screws, and worm gears 17, and projecting parts carried by the mast and the lower beam member and against both of which the said means have bearing.

13. In a crane for hoisting, a lower member provided with a socket, a mast having its end within the socket of the lower member and shiftable means for raising and lowering the mast, said shiftable means comprising a pair of lifting screws which have bearing engagement with the lower member and with the mast, and a chain to hold both screws in position.

14. In a crane for hoisting, a body part, a swinging distributing jib suspended from said body part, an engine on said jib, a sliding jib extension carried by the jib, a sliding hoisting truck on said jib-extension, and a lifting block 58, pulleys 63, rope 59 passing around said pulleys, and pulleys 61, 62, around which said rope passes, the ends of said rope being secured respectively to the swinging distributing jib and to the engine thereon.

15. In a crane for hoisting, a body part, a swinging distributing jib carried by said body part, a pair of rails carried by said jib, a sliding jib extension carried by the jib and provided with a pair of rails parallel with those first-named, and a sliding hoisting truck on said jib, extension and provided with wheels adapted to run upon both pairs of rails.

16. In a crane for hoisting, a body part, a swinging distributing jib suspended therefrom, an engine on said jib, a sliding jib-extension carried by the jib, a sliding hoisting truck on the jib-extension, and ropes 67 and 77, secured at their ends respectively to the fore-part and hindpart of said hoisting truck and at their other ends to a roller 76 of the engine, and which ropes pass around pulleys on the jib extension and around pulleys on the swinging jib.

17. In a crane for hoisting, a body part, a swinging distributing jib thereon, counter-weight means slidably connected with said jib, said means including a weighted box 81, braking means therefor, and connections for applying the braking means when the jib is balanced.

18. In a crane for hoisting, a body part, a swinging distributing jib thereon, counterweight means slidably connected with said jib, said means including a weighted box 81, braking means therefor, connections for applying the braking means when the jib is balanced, a chain or rope 85 controlling the braking means, and friction sheaves for controlling the chain or rope.

19. In a crane for hoisting, a body part, a swinging distributing jib thereon, an engine carried by said jib, independent movable frames and connections controlled thereby for moving parts of the crane as desired, and a plurality of independent hand levers and connections therefrom to the frames.

20. In a frame for hoisting, a lower member provided with a socket, a mast having its end within the socket of the lower member, a swinging distributing jib thereon, a jib-extension slidably carried by said jib, an engine on said jib, a hoisting truck slidably carried by the jib-extension, independently movable frames and connections controlled thereby for sliding the aforesaid upper member to vary the height of the mast, for swinging the jib for advancing and retracting the jib-extension, and for traversing the hoisting truck and a plurality of independent hand levers and connections therefrom to the frames.

21. In a crane for hoisting, a body part, a swinging distributing jib thereon, an engine on said jib, a hoisting truck slidably carried by the jib, operating connections from the engine to the hoisting truck, a weighted lever secured upon an axle of the engine, a sleeve mounted upon the engine frame, a projection carried by said sleeve, and a hand lever operating upon the sleeve whereby the projection moves the weighted lever aforesaid.

In testimony whereof, I have signed my name to this specification in the presence of two subscribing witnesses.

NIELS ANDERS HANSEN ABEL.

Witnesses:
  JULIUS NIELSEN,
  A. CHRISTENSEN.